United States Patent [19]

Sorimachi

[11] 4,355,887
[45] Oct. 26, 1982

[54] DOCUMENT HOLD-DOWN COVER ARRANGEMENT FOR A COPY MACHINE

[75] Inventor: Akira Sorimachi, Yokohama, Japan

[73] Assignee: Katoh Electrical Machinery Co. Ltd., Yokohama, Japan

[21] Appl. No.: 181,050

[22] Filed: Aug. 25, 1980

[30] Foreign Application Priority Data

Aug. 31, 1979 [JP] Japan .................. 54-120127[U]

[51] Int. Cl.³ .................................. G03B 27/32
[52] U.S. Cl. .................................. 355/25; 355/75
[58] Field of Search .................. 355/75, 25

[56] References Cited

U.S. PATENT DOCUMENTS

| | | | |
|---|---|---|---|
| 4,124,296 | 11/1978 | Kishi et al. | 355/75 |
| 4,150,896 | 4/1979 | Wakeman | 355/75 |
| 4,172,660 | 10/1979 | Yanofsky et al. | 355/75 |

Primary Examiner—Monroe H. Hayes
Attorney, Agent, or Firm—George B. Oujevolk

[57] ABSTRACT

A document hold-down cover for a copy machine comprises a lifting means, a hinge means, a deck plate of said copy machine, a hold-down-cover, the lifting means is arranged between said deck plate and said hold-down cover, said hinge means is attached between said lifting means and said hold-down cover. According to the invention, when copying thick material which is put on the contacting glass for copying the closed-hold-down cover comes into parallel with the material on the glass since the lifting means is lifted by leverage. When the material is taken off the glass cover, the lifting means comes down or returns back to the first position by gravity. The hold-down cover can be opened and closed in both the first position and the lifting position.

2 Claims, 9 Drawing Figures

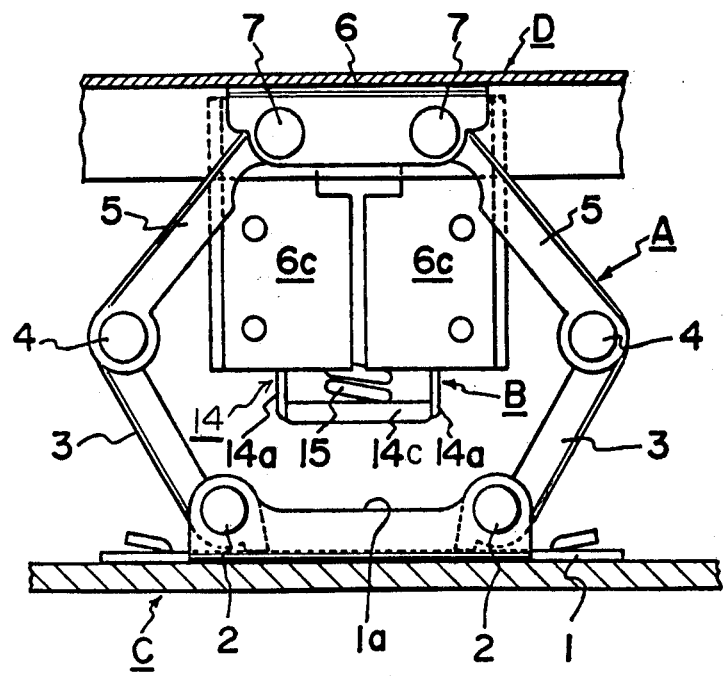
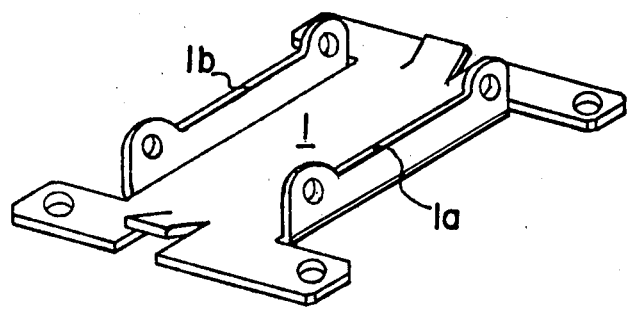

DOCUMENT HOLD-DOWN COVER ARRANGEMENT FOR A COPY MACHINE

BACKGROUND OF THE INVENTION

The present invention relates to a hold-down cover for a copy machine and the like.

BRIEF DESCRIPTION OF THE PRIOR ART

Usually, a hold-down cover which covers the cover surface of the glass cover of a copy machine is pivotally connected to an upper deck plate at one side end by means of a hinge, so that it has a deflect because one side of the cover rises and light escapes to the outside where material to be copied is placed on the glass cover in order to copy thick material.

OBJECTS OF THE INVENTION

An object of the invention is to provide a device for holding a hold-down cover of a copy machine in which the hold-down cover takes a position parallel to the copy machine glass top even if the material copied is thick material such as a book.

Other objects and advantages of this invention will be apparent from the following description when taken in conjunction with the drawings, in which:

BRIEF DESCRIPTION OF THE DRAWINGS

FIG. 5 is a front view of FIG. 4;

FIG. 6 is a perspective view showing a base plate of present invention;

DETAILED DESCRIPTION

Figure 1:
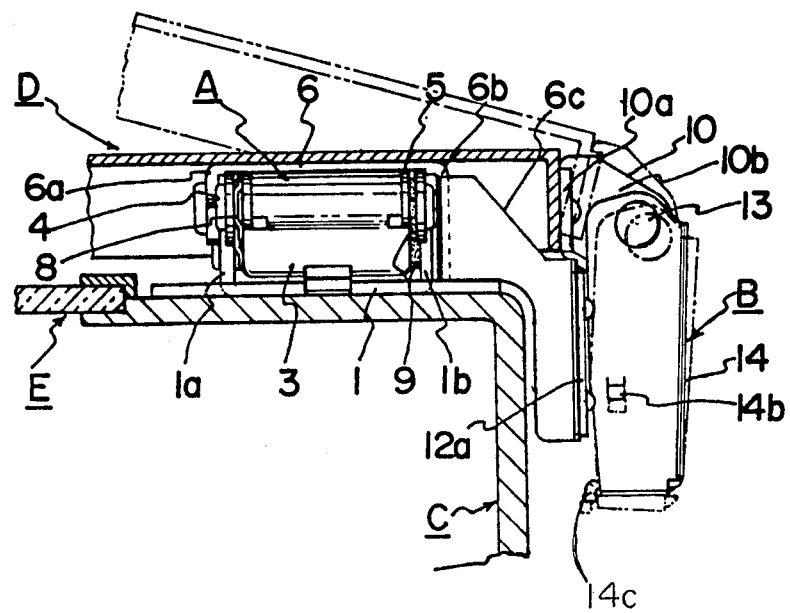
FIG. 1 is a side elevational view according to an embodiment of the present invention when the hold down cover is closed.
Figure 2:
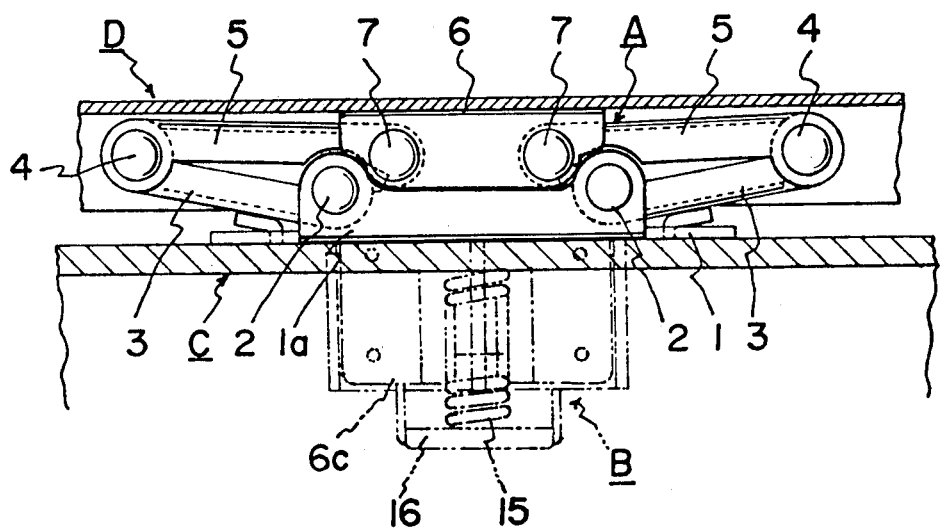
FIG. 2 is a front view of FIG. 1.
Figure 3:
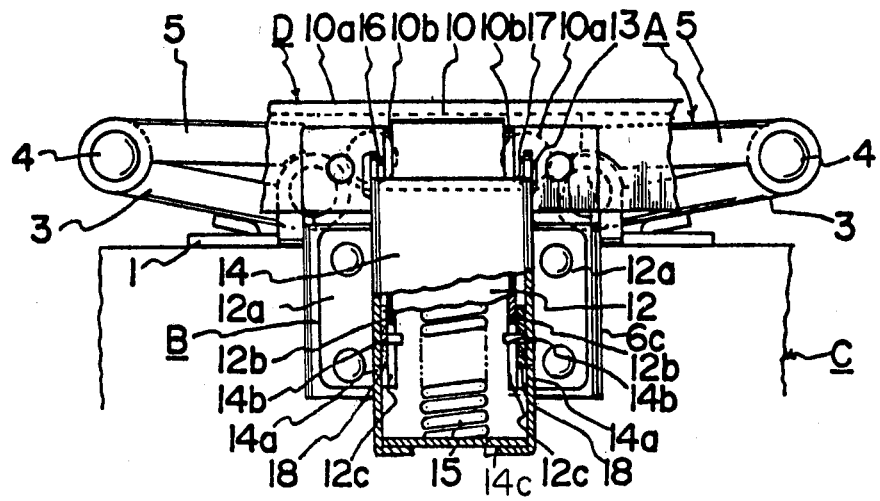
FIG. 3 is a partially sectional rear side view of FIG. 1.

As seen in the accompanying drawings of FIG. 1 to FIG. 9, numeral A denotes a lifting means, the lifting means A comprises a base plate 1, a pair of first elevational arms 3, 3 are pivotally connected to one side portion of front and rear plates 1a, 1b of the base plate 1 by medium of rivetting pins 2, 2, a pair of second elevational arms 5, 5 pivotally connected to side portions of the pair of first elevational arms 3, 3 by medium of rivetting pins 4, 4, and a bracket 6 having front and rear side plates 6a, 6b and an attaching portion 6c, the front and rear side plates 6a, 6b of bracket 6 are pivotally connected to the one side portion of each pair of second elevational arms 5, 5 by medium of rivetting pin 7, 7. A resilient member 8 such as a spring washer and frictional member 9 such as fibers are inserted between overlapped portions of the front and rear plates 1a, 1b of the base plate 1 and one side portion of the pair of first elevational arms 3, 3, the another side portion of the pair of first elevational arms 3, 3 and one side portion of the pair of second elevational arms 5, 5, and another side portion of the pair of second elevational arms 5, 5 and the front and rear plates 6a, 6b of the bracket 6. The rivetting pins 2, 2, 4, 4, 7, 7 are inserted through the intermediate portions of the resilient members 8 and frictional members 9.

Numeral B denotes a hinge means, the hinge means B comprises a cover retainer 10 having attaching plates 10a, 10a, a hinge bracket 12 which is pivotally connected to a pair of side plates 10b, 10b of the cover retainer 10 by means of a hinge pin 11, a spring cover 14 which is also pivotally connected to the both side plates 10b, 10b of the cover retainer 10 by medium of a rivetting pin 13 and has pair of guide slits 12c, 12c is inserted guide pieces 14b, 14b protruding inwardly from both side plates 14a, 14a and a coiled compression spring 15 interposed between a bottom plate 14c of the spring cover 14 and an upper plate 12d of the hinge bracket 12.

Resilient members 16 such as spring washer is interposed between the one side plates 10b, 14a of the cover retainer 10 and the spring cover 14. A friction member 17 such as fibers or the like is inserted between the another side plates 10b, 14a of the cover retainer 10 and the spring cover 14. Furthermore, friction members 18, 18 such as fibers or the like are inserted between both side plates 12b, 12b, 14a, 14a of the hinge bracket 12 and spring cover 14.

Rivetting pin 13 is inserted through the resilient member 16 and friction member 17. The guide pieces 14b, 14b pass through the friction members 18, 18. This cover retainer 10 and spring cover 14 are stationary and smoothly swing and slide because of frictional resiliency.

The base plate 1 of lifting means A is fixed to an upper deck plate C of a copy machine, an attaching member 6c of the bracket 6 is fixed to attaching members 12a, 12a of the hinge bracket 12, one side end of the hold down cover D is fixed to the attaching members 10a, 10a of the cover retainer 10.

Figure 4:
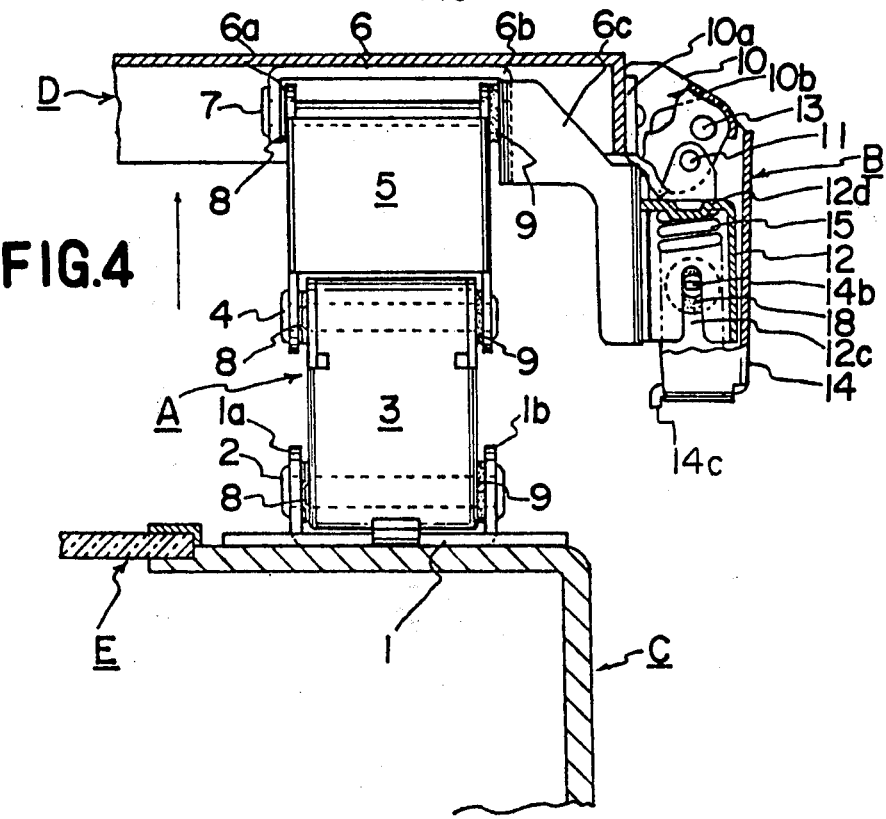
FIG. 4 is a partially sectional side view of FIG. 1 when the lifting means is operated.
Figure 7:
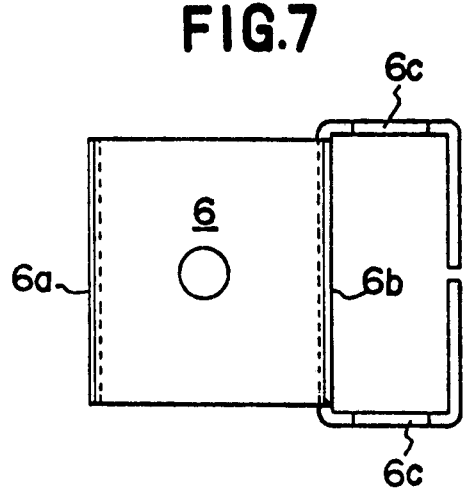
FIG. 7 is a plan view showing a bracket of present invention.
Figure 8:
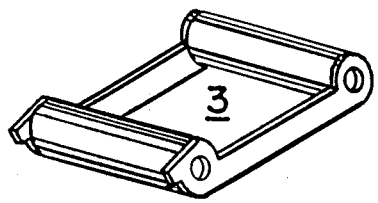
FIG. 8 is a perspective view showing a first elevational arm of present invention; and, FIG. 9 is a perspective view showing a second elevational arm of present invention.
Figure 9:
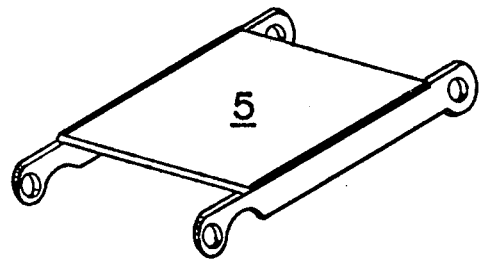

For the purpose of giving those skilled in the art a better understanding of the invention, the following explanation is given:

When the hold-down cover D is opened in order to put material to be copied on the glass cover, the hold-down cover D rotates about the axis of the rivetting pin 13 and is opened smoothly with the help of the resilient force of the coiled compression spring 15 without working against the full weight of the hold-down cover D. When the pushing cover D is closed, the hold-down cover D progresses smoothly and slowly owing to the resiliency of the coil spring 15. Thus, lifting means A does not operate when material to be copied is not too thick. But when material to be copied is thick such as a book, lifting means A operates as follows; when hold-down cover D is closed from an opened condition one side of the lifting means A is provided a rising force by the leverage against the material to be copied so that the bracket 6 of the lifting means A raises with the hinge means B only the thickness of the material or book as shown in FIG. 4 and FIG. 5. Thus the hold-down cover D comes parallel to the copied material, book or glass cover E. And in this condition, when the hold-down cover D is opened it is disposed as shown in dotted line in FIG. 1 and is closed as hereinbefore described.

When the copied material or book is taken off of the glass cover the bracket 6 of the lifting means A comes down and returns back to the first position by gravity and the hold-down cover D also operates by gravity.

It is to be understood that the embodiments of the present invention shown are merely illustrative of a preferred embodiments, and that such charges may be made as some within the scope of the following claims.

I claim:

1. A document hold-down cover for a copy machine, for holding material to be copied onto the transparent top of the copy machine, comprising in combination:
   (a) a deck plate (C) on said copy machine having a horizontal support portion;
   (b) lifting means (A) affixed to said deck plate (C) horizontal portion, said lifting means having a rectangular base plate (1) over said deck plate (C) with side wall plates (1a, 1b), a pair of first elevational arms (3) pivotally connected to said wall plates (1a, 1b), a pair of second elevational arms (5) pivotally connected to said first elevational arms so that said first and second elevational arms can telescope in the vertical plane;
   (c) hinge means (B) comprising a hinge bracket (12) pivotally connected to said second elevational arms (5), a cover retainer (10) pivotally connected to said hinge bracket (12) by a hinge pin (11), a spring cover also pivotally connected to said cover retainer (10) by a rivetting pin (13), and a coiled compression spring (15) interposed between the spring cover (14) and said hinge bracket (12) with frictional resilient means coupled to the spring cover (14 and the cover retainer (10) to provide controlled smooth swing movement; and,
   (d) a document hold down cover (D) fixedly attached to said cover retainer (10) of said hinge means (B);
   whereby, when the hold-down cover (D) is opened in order to put material to be copied on the copy machine transparent top, the hold-down cover (D) rotates about the axis of the hinge pin (11) and opens smoothly because of the compression spring (15), when the hold-down cover (D) is closed, the hold-down cover progresses smoothly and slowly because of the resiliency of the coil spring and the lifting means (A) does not function, but when the material to be copied is thick, the lifting means (A) is provided leverage by the material to be copied so that the lifting means (A) raises the hinge means (B) the required heighth, bringing the hold-down cover in parallel with the transparent top (E).

2. A document hold-down cover for a copy machine, for holding material to be copied on to the transparent top of the copy machine, comprising in combination:
   (a) a deck plate (C) on said copy machine having a horizontal support portion;
   (b) lifting means (A) affixed to said deck plate (C) horizontal portion, said lifting means having a rectangular base plate (1) over said deck plate (C) with side wall plates (1a, 1b), a pair of first elevational arms (3) pivotally connected to said wall plates (1a, 1b), a pair of second elevational arms (5) pivotally connected to said first elevational arms so that said first and second elevational arms can telescope in the vertical plane, bracket means (6) with front and rear bracket side plates (6a, 6b) pivotally connected to second elevational arms (5);
   (c) hinge means (B) comprising a hinge bracket (12) fixed to said bracket means (6), a cover retainer (10) pivotally connected to said hinge bracket (12) by a hinge pin (11), a spring cover also pivotally connected to said cover retainer (10) by a rivetting pin (13), and a coiled compression spring (15) interposed between the spring cover (14) and said hinge bracket (12) with frictional resilient means coupled to the spring cover (14) and the cover retainer (10) to provide controlled smooth swing movement; and
   (d) a document hold-down cover (D) fixedly attached to said cover retainer (10) of said hinge means (B);
   whereby, when the hold-down cover (D) is opened in order to put material to be copied on the copy machine transparent top, the hold-down cover (D) rotates about the axis of the hinge pin (11) and opens smoothly because of the compression spring (15), when the hold-down cover (D) is closed, the hold-down cover progresses smoothly and slowly because of the resiliency of the coil spring and the lifting means (A) does not function, but when the material to be copied is thick, the lifting means (A) is provided leverage by the material to be copied so that the bracket means (6) raises the hinge means (B) the required heighth bringing the hold-down cover in parallel with the transparent top (E).

* * * * *